(12) United States Patent
Trammell

(10) Patent No.: US 7,934,307 B2
(45) Date of Patent: May 3, 2011

(54) METHOD OF CONSTRUCTING A LINEAR DRIVE MOTOR ASSEMBLY WITH A CORE

(75) Inventor: Glenn Sterling Trammell, Fort Smith, AR (US)

(73) Assignee: Baldor Electric Company, Fort Smith, AR (US)

( * ) Notice: Subject to any disclaimer, the term of this patent is extended or adjusted under 35 U.S.C. 154(b) by 389 days.

(21) Appl. No.: 12/196,844

(22) Filed: Aug. 22, 2008

(65) Prior Publication Data
US 2010/0043204 A1    Feb. 25, 2010

(51) Int. Cl.
*H02K 15/16* (2006.01)
(52) U.S. Cl. .................... 29/596; 310/12.02; 310/156.48
(58) Field of Classification Search .............. 310/112, 310/191, 74, 113, 117, 121, 17, 12–13; 29/592.1, 29/596–598; 384/12
See application file for complete search history.

(56) References Cited

U.S. PATENT DOCUMENTS

| | | | | |
|---|---|---|---|---|
| 4,835,424 A * | 5/1989 | Hoffman et al. | ............ | 310/12.05 |
| 6,787,942 B2 * | 9/2004 | Lilie et al. | .................... | 310/12.01 |
| 6,789,305 B2 * | 9/2004 | Seki et al. | .................... | 29/596 |
| 6,882,065 B2 * | 4/2005 | Morel et al. | ................ | 310/12.01 |
| 7,145,271 B2 * | 12/2006 | Thirunarayan et al. | ..... | 310/12.01 |
| 7,291,953 B1 * | 11/2007 | Smith et al. | .................... | 310/112 |
| 7,566,997 B2 * | 7/2009 | Trammell | .................. | 310/12.31 |
| 2010/0043204 A1 * | 2/2010 | Trammell | ........................ | 29/596 |

OTHER PUBLICATIONS

HEXCEL Composites, HexWeb(™) Honeycomb Attributes and Properties: A comprehensive guide to standard Hexcel honeycomb materials, configurations, and mechanical properties, 1999, 40 pages.

* cited by examiner

*Primary Examiner* — Minh Trinh
(74) *Attorney, Agent, or Firm* — Thompson Coburn LLP

(57) ABSTRACT

A method of constructing a linear drive motor assembly is disclosed. In accordance with the method, a support plate and a platen with a plurality of teeth are provided. A honeycomb core comprising a commercially available, off-the-shelf honeycomb material is provided. The honeycomb core has a plurality of cells arranged in a planar array where the plurality of cells is defined by walls extending in planes substantially perpendicular to the planar array. The support plate is directly secured to one side of the planar array. The platen is secured directly to the other side of the planar array. A forcer having a motor stack is magnetically coupleable to the platen to form a linear drive motor.

9 Claims, 6 Drawing Sheets

METHOD OF CONSTRUCTING A LINEAR DRIVE MOTOR ASSEMBLY WITH A CORE

BACKGROUND

The following disclosure relates to method used in constructing and/or manufacturing a linear drive motor assembly. Specifically, the linear drive motor assembly is constructed and/or manufactured using a honeycomb core between a support plate and a platen of the linear drive motor. Preferably, the honeycomb core comprises a commercially available, off-the-shelf honeycomb material.

DETAILED DESCRIPTION OF THE DISCLOSED EMBODIMENTS

Figure 1:
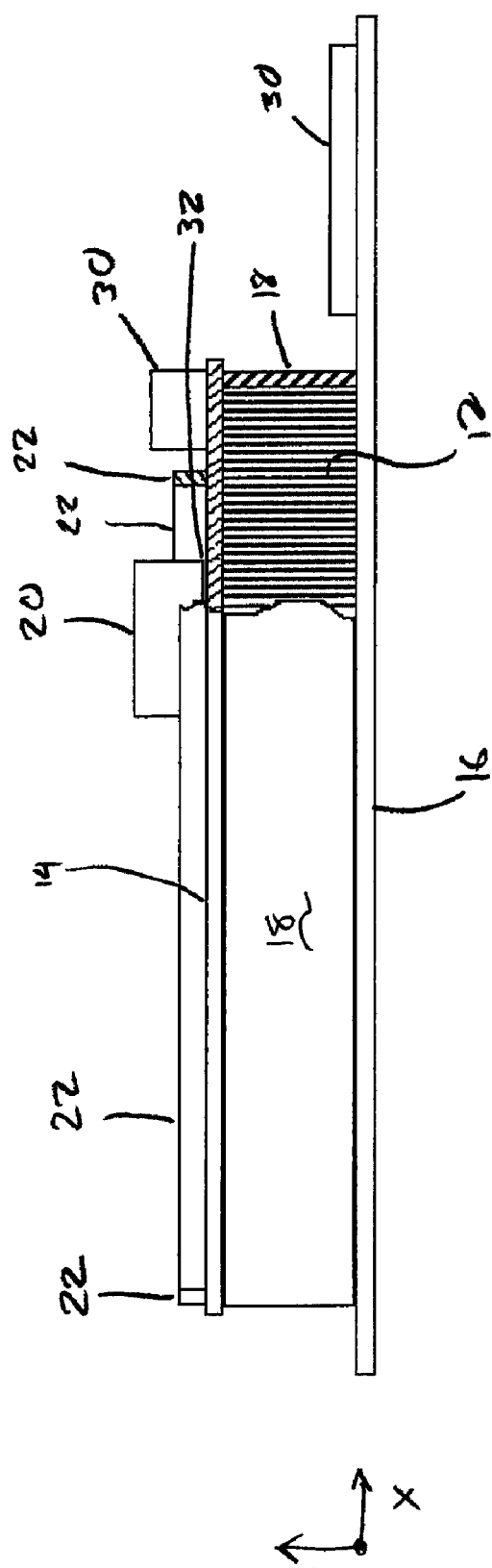
FIG. 1 shows a side elevational view of a linear drive motor assembly with a portion of a side panel broken away to show a honeycomb core between a platen and a support plate of the linear drive motor assembly.

FIG. 1 shows a side elevational view of a linear drive motor assembly 10 constructed with a honeycomb core 12 disposed between a platen 14 and a support plate 16. Side panels 18 are arranged around the honeycomb core 12 between the platen 14 and the support plate 16 primarily for cosmetic purposes and to enclose the honeycomb core. The linear drive motor assembly 10 has a forcer magnetically coupled to the platen 14. Bumpers 22 may be mounted to the platen 14 to constrain motion of the forcer relative to the platen. As described below in greater detail, depending upon the end user's or integrator's application, fixtures, work holdings, mounts, and other equipment (generally indicated as reference character 30) may be mounted directly on the platen 14 in an area outside the bumpers and/or the support plate 12.

The platen 14 is a generally planar piece with a length and a width defining an area ("X" and "Y" directions), and a thickness ("Z" direction) of typically 0.070 inches to 0.105 inches. Preferably, the platen is directly mounted to the core and becomes the sole top structural support member and the secondary for the linear drive motor. The platen has a plurality of teeth having a sufficient magnetic permeability so that the teeth respond to magnetic fields from a motor stack in the forcer to create motion for the forcer. The platen may comprise a photo-chemically etched plate in a square pattern with square teeth. The teeth may be 0.020 inches square with a gap of 0.020 inches and a depth greater than 0.007 inches making the linear drive motor a "40 mil pitch" motor. The teeth of the platen may also be cut using rotary cutter on a machine tool such as a CNC mill or the like. It should be appreciated that the size and pitch of the teeth of the platen may vary for different applications and may be formed to create a "40 mil pitch" motor, a "20 mil pitch" motor, a "1 mm pitch" motor, or a "5 mm pitch" motor. The platen provides a return path for flux generated by the forcer, thereby allowing the forcer to translate across the platen in response to magnetic fields generated by the motor stack(s) in the forcer. The spacing between the teeth of the platen may be filled with a non-magnetic filler, such as an epoxy, and the surface of the platen may be lapped for flatness as necessary to provide a smooth surface for generating a sufficiently supporting gas bearing between the forcer to the platen.

Figure 2:
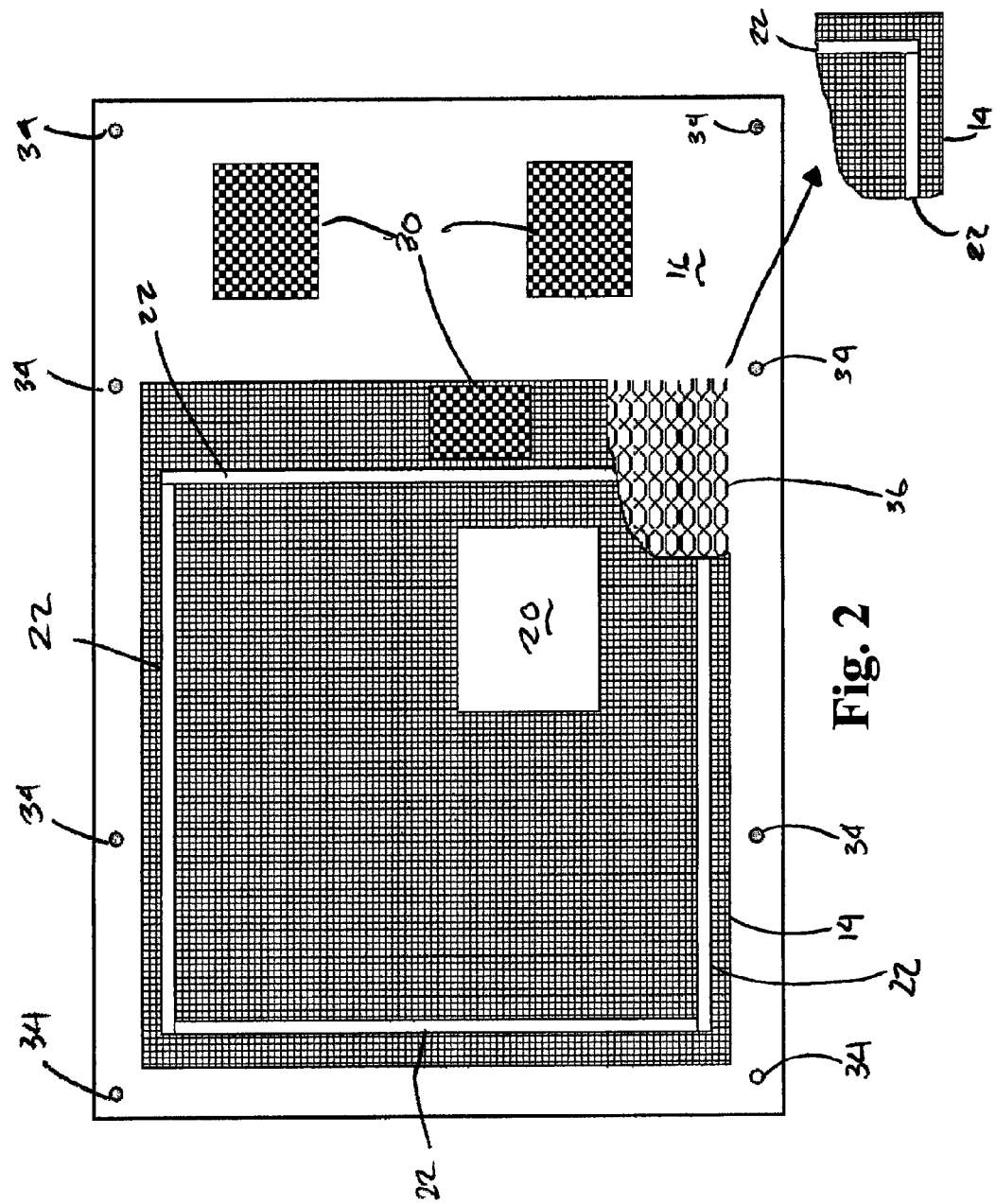
FIG. 2 shows a top elevational view of a linear drive motor assembly of FIG. 1 with a portion of a platen of the linear drive motor assembly removed to show a honeycomb core.

Providing a flat platen enhances the functioning of a gas bearing 32 extending between the platen and the forcer. As shown in FIG. 1, the forcer is supported above the platen with the gas bearing. It should be appreciated that the linear drive motor may be inverted such that the forcer is below the platen. The gas bearing 32 may be formed by directing pressurized gas (i.e., air) through the forcer 20 into the space between the forcer and the platen 14 via a system of ports formed on the bottom surface of the forcer. Preferably, the forcer 20 is positionable relative to the platen in the "X" and "Y" directions. For purposes of illustration, FIGS. 1 and 2 show a forcer comprising a housing with two motor stacks generating motion for the forcer above the platen, one motor stack effecting motion in the "X" direction and the other motor stack effecting motion in the "Y" direction. It should also be appreciated that the linear drive motor may comprise a two-phase, four-phase, or other polyphase motor depending upon the application, and the forcer, the housing, the number of motor stacks in the housing, and the shape of the platen may all be varied depending upon the application, and the motion and direction requirements of the application.

Opposite the platen, a support plate 16 is provided to mount the linear drive motor assembly to the end user's or integrator's equipment, as necessary, depending upon the application. The support plate is preferably made from a steel material to provide sufficient strength and rigidity, but it should be appreciated that the support plate may be made from other materials depending upon the application. The support plate may have an area that is greater than an area of the platen or substantially equal to an area of the platen depending upon the application. For purposes of illustration, in FIGS. 1 and 2, the area of the support plate 16 is greater than the area of the platen 14, thus providing locations on the support plate for the end-user or integrator to the mount fixtures and/or work holdings 30 that the end user or integrator may use in connection with the linear drive motor assembly. The support plate may also have mounting holes 34 as necessary depending upon the application to allow mounting of the linear drive motor assembly to a support structure associated with the end-user's or integrator's application.

The honeycomb core 12 is provided between the platen 14 and the support plate 16 and provides additional support in the "Z" direction for the linear drive motor assembly. The honeycomb core is formed from a honeycomb material that is manufactured by bonding together sheets of flexible foil and expanding the assembly to form a cellular honeycomb configuration. Cells 36 of the honeycomb core are arranged in an array where each of the cells is defined by a plurality of walls that extend in a direction generally perpendicular to the cellular array. The honeycomb cells 36 may comprise hexagonal honeycombs or other shapes, and the length of the walls is uniform and corresponds to a thickness of the honeycomb core (i.e., the "Z" direction). The cellular or planar array defines an area to which the platen and the support plate are secured when manufacturing the linear drive motor assembly. Preferably, the honeycomb material used for the core comprises a commercially available, off-the-shelf material. A preferred source of commercially available, off-the-shelf honeycomb material is Hexcel Corporation of Stamford, Conn. The honeycomb material may comprise commercial grade aluminum such as a 3000 series aluminum alloy foil, and may be supplied in either an expanded or an unexpanded condition (also sometimes referred to as "honeycomb before expansion"). The honeycomb material may also comprise Hexweb™ 5052 or 5026 supplied by Hexcel Corporation. In an expanded form, the commercially available, off-the-shelf honeycomb material may be provided in 4 foot by 8 foot sheets with a thickness of between 0.125 inches and 20 inches. As will be described below in greater detail, many different stock thicknesses of commercially available, off-the-shelf honeycomb material may be staged or stocked in the manufacturing process, and depending upon customer requirements, a stock thickness of material may be selected, leaving only the area to be sized as desired in the length and the width directions ("X" and "Y" directions) to form a core for the linear drive motor assembly, thus increasing manufacturing flexibility and reducing lead-time associated with orders. The commercially available, off-the-shelf honeycomb material in an unexpanded form may also be staged in the manufacturing process. In an unexpanded form, the honeycomb material may be cut-off from a stock elongated extrusion to a desired thickness (i.e., "Z" direction) and then expanded to establish an area which may subsequently be sized, re-sized, and dimensioned as desired in the length and width directions ("X" and "Y" directions), as necessary, to form the core for the linear drive motor assembly. As described herein, the honeycomb material is generally planar and disposed between a generally planar platen and a generally planar support plate. However, it should be appreciated that the honeycomb material may flexible allowing it to be formed in complex curves and disposed between a platen and/or support plate having a similar or cooperating complex curvature, thus allowing construction of a multi-axis drive motor assembly.

Figure 3:
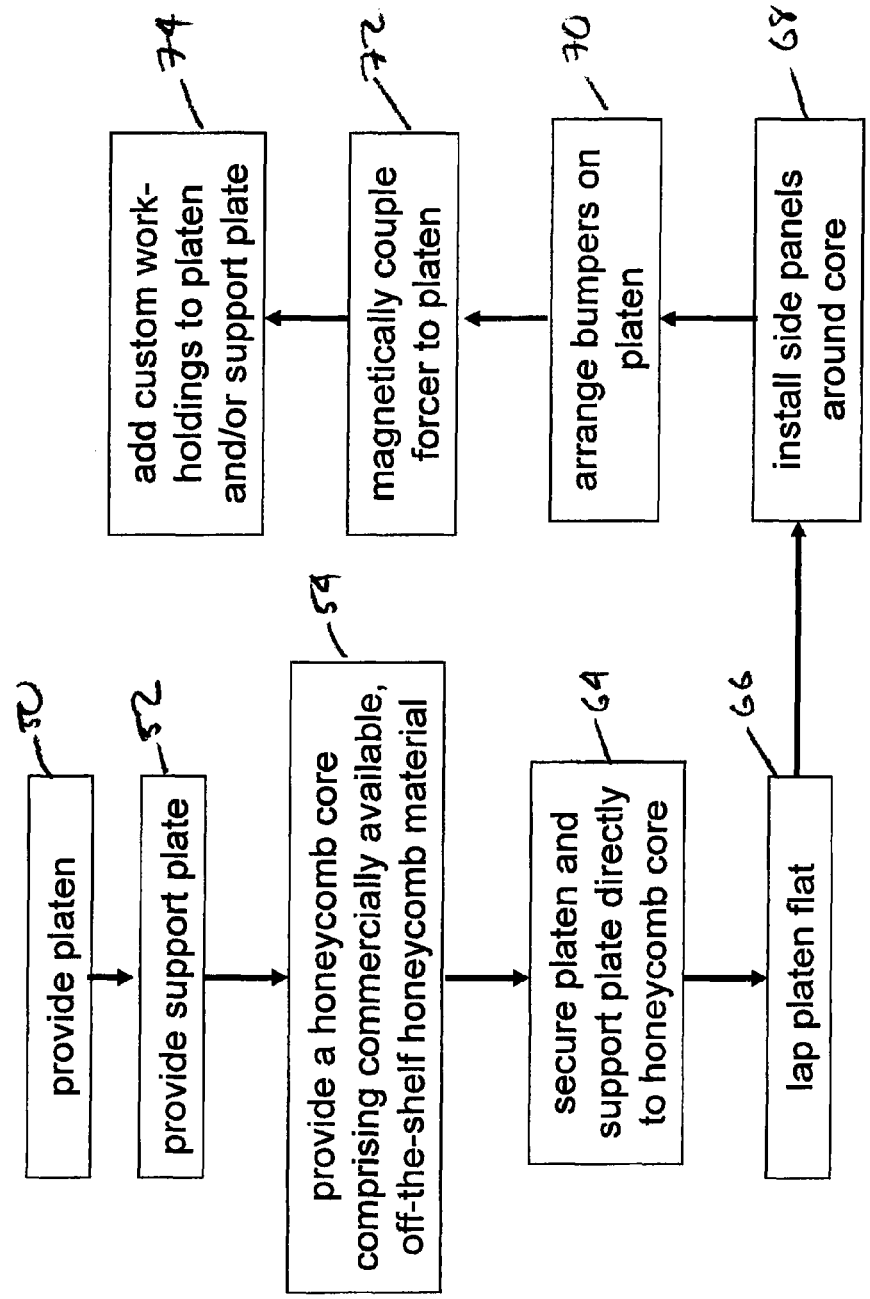
FIG. 3 is a flow chart illustrating one embodiment of the steps in the method of constructing a linear drive motor using a honeycomb core.
Figure 4:
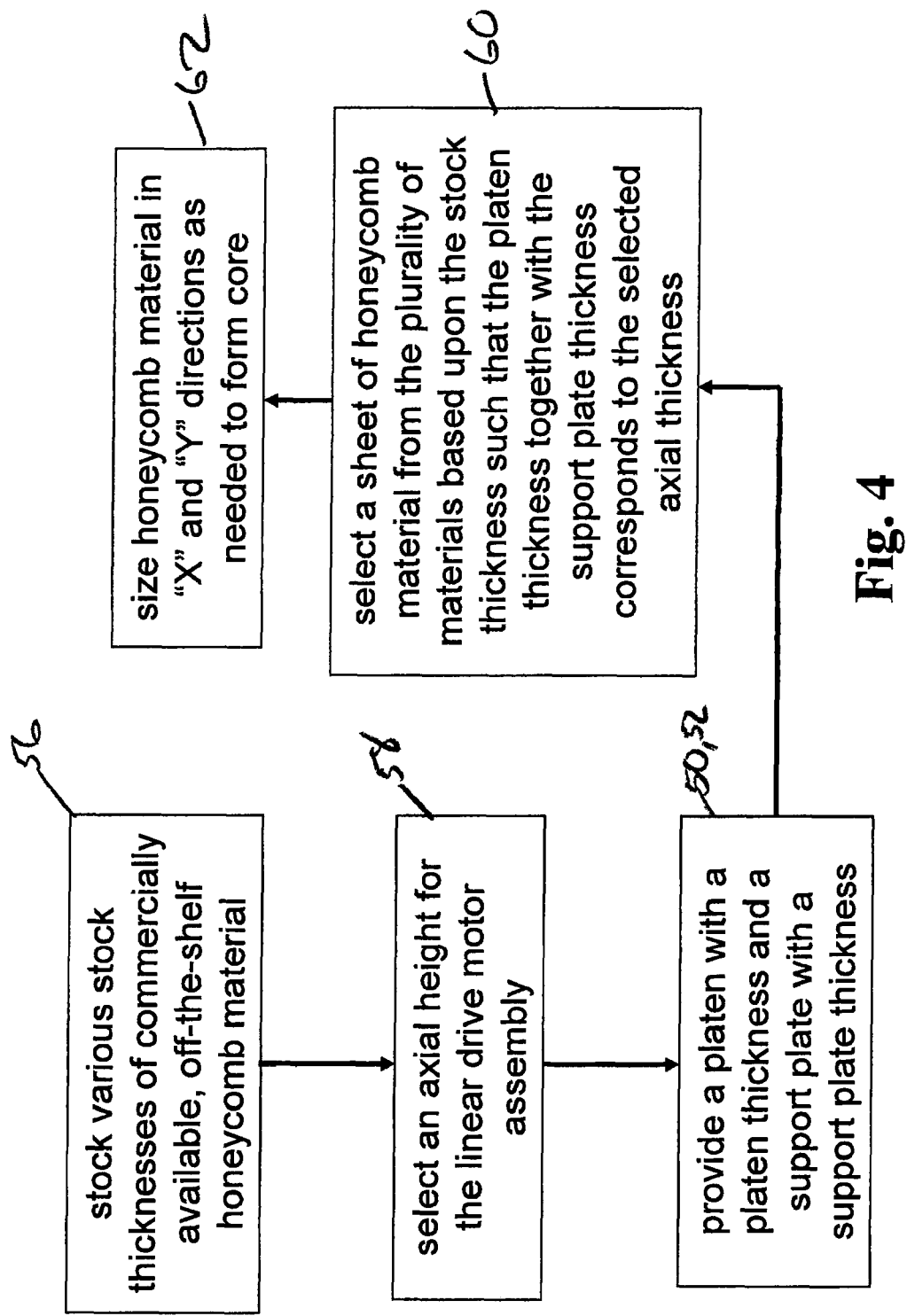
FIG. 4 is a flow chart illustrating an alternate embodiment of the steps in the method constructing a linear drive motor using a honeycomb core.

FIGS. 3 and 4 provide flow charts for the steps in manufacturing a linear drive motor assembly. A platen and a support plate are provided in dimensions of length, width and thickness, as may be required by the application (blocks 50,52). A honeycomb core is provided (block 54). Preferably, the honeycomb core is formed from a commercially available, off-the-shelf honey comb material. Depending upon "Z" axis or direction requirements, the honeycomb material thickness is selected. Preferably, a plurality of various stock thickness of sheet form expanded honeycomb material are stocked or staged in the manufacturing process (FIG. 4, block 56), and depending upon axial height requirements ("Z" direction) for the linear drive motor assembly (FIG. 4, block 58), for instance, to meet end-user thickness requirements or to provide adequate rigidity to the assembly or to minimize deflections of motor loads or the weight end-user fixtures or loads, a sheet with a stock thickness is selected such that the stock thickness together with thickness of the platen and the support plate correspond to the axial height ("Z" direction) (FIG. 4, block 60). For unexpanded honeycomb material, the extruded length of stock material is cut-off to the desired thickness and then expanded to a sufficient area, for instance, to allow subsequent cutting to size along the length and the width ("X" and "Y") directions, as may be necessary. The unexpanded material may also be expanded directly to the necessary length and width ("X" and "Y" directions) so as to eliminate the step of cutting to size. The expanded honeycomb material may be sized along its length and width ("X" and "Y" directions) (FIG. 4, block 62), as necessary, to form a honeycomb core with an area sufficient to support the platen and support plate, limit deflection of the linear drive motor assembly, and provide stiffness for self-supporting and/or inverted applications. To form the linear drive motor assembly, the platen is secured to one side of the honeycomb core in a manner such that the platen defines a plane parallel to the cellular or planar array of the honeycomb cells, that is, a direction transverse to the direction of the walls of the honeycomb cells, and the support plate is secured in a parallel plane to the axially opposite side of the honeycomb core (FIG. 3, block 64). The platen and support plate may be secured to the honeycomb core with an epoxy, welding, or with mechanical fasteners extending between the platen, core and support. Fasteners may also be used for providing locations for mounting fixtures. The platen may be lapped before or after it is bonded to the honeycomb core, and/or before or after the support place is bonded to the honeycomb core (FIG. 3, block 66). The lapped platen creates a very flat and smooth surface that supports the gas bearing between the forcer and the platen. After the honeycomb core is assembled with the platen and the support plate, side panels are placed around the core between the platen and the support place to enclose the core (FIG. 3, block 68). Bumpers may be provided on the top surface of the platen (FIG. 3, block 70) and the forcer may be positioned adjacent the platen and magnetically coupled thereto (FIG. 3, block 72). End users or integrators may mount equipment and/or fixtures or mounting accessories on the platen and/or the support plate, as necessary depending upon the application, preferably in an area outside of the bumpers that constrain the forcer (FIG. 3, block 74).

The use of commercially available, off-the-shelf honeycomb material for a core of the linear drive motor assembly provides sufficient rigidity to reduce dynamic and static deflections. A dual axis linear stepper motor assembly manufactured in accordance with the techniques described herein may provide 30 pounds of static force while providing 400 pounds of attractive force. The use of the honeycomb core reduces the weight associated with the linear drive motor assembly which allows the linear drive motor assembly to be used in a self-supporting or inverted application. Typical applications where a linear drive motor assembly with a honeycomb core may be useful include: pick and place systems, electronic and communication equipment assembly, material handling, visual inspection equipment, part assembly/insertion, 3-D prototype manufacturing, semiconductor manufacturing, packaging, and biomedical applications.

Figure 5:
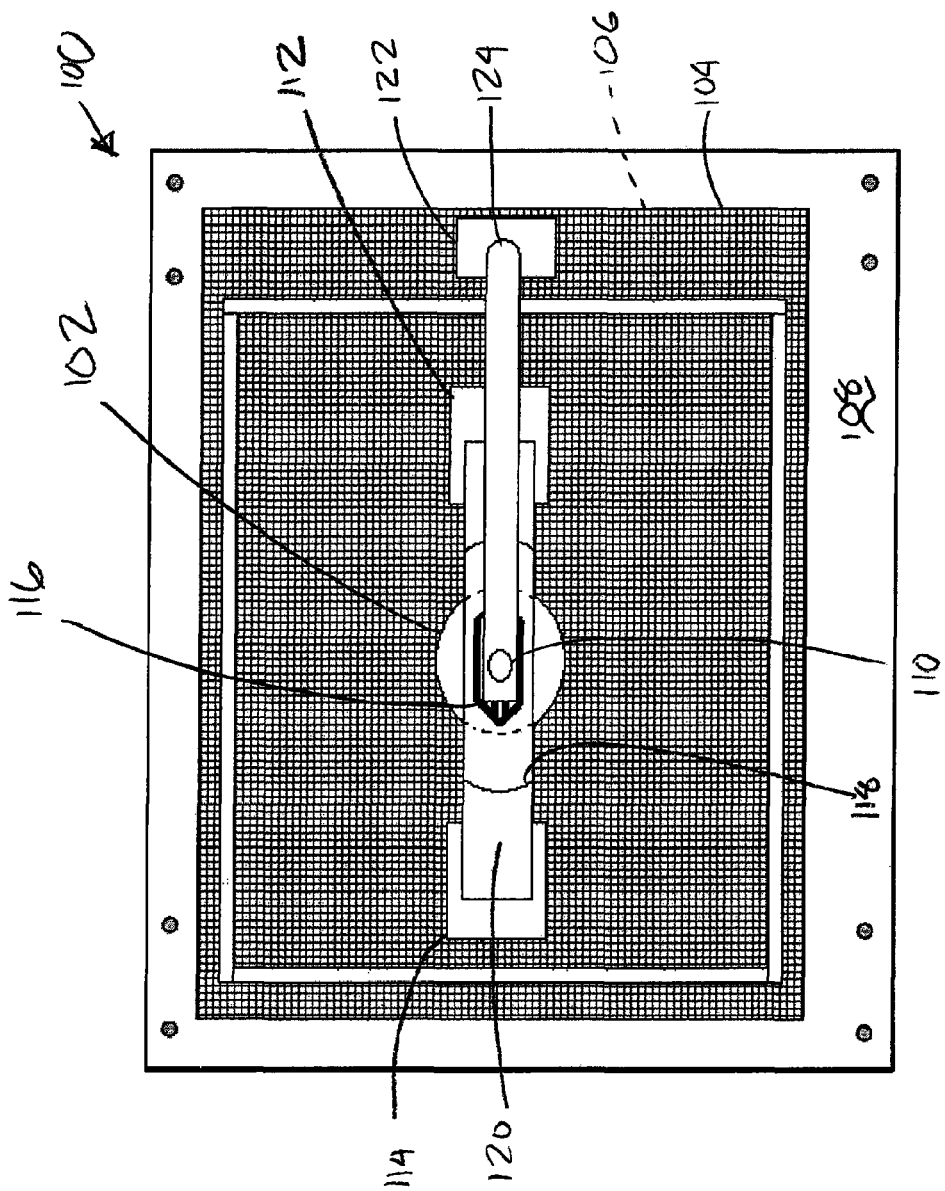
FIG. 5 shows an alternate embodiment of a linear drive motor assembly of FIG. 2 configured for an end-user or integrator application requiring an access hole through the platen, honeycomb core, and support plate to allow introduction of an object into the linear drive motor assembly along the "Z direction.
Figure 6:
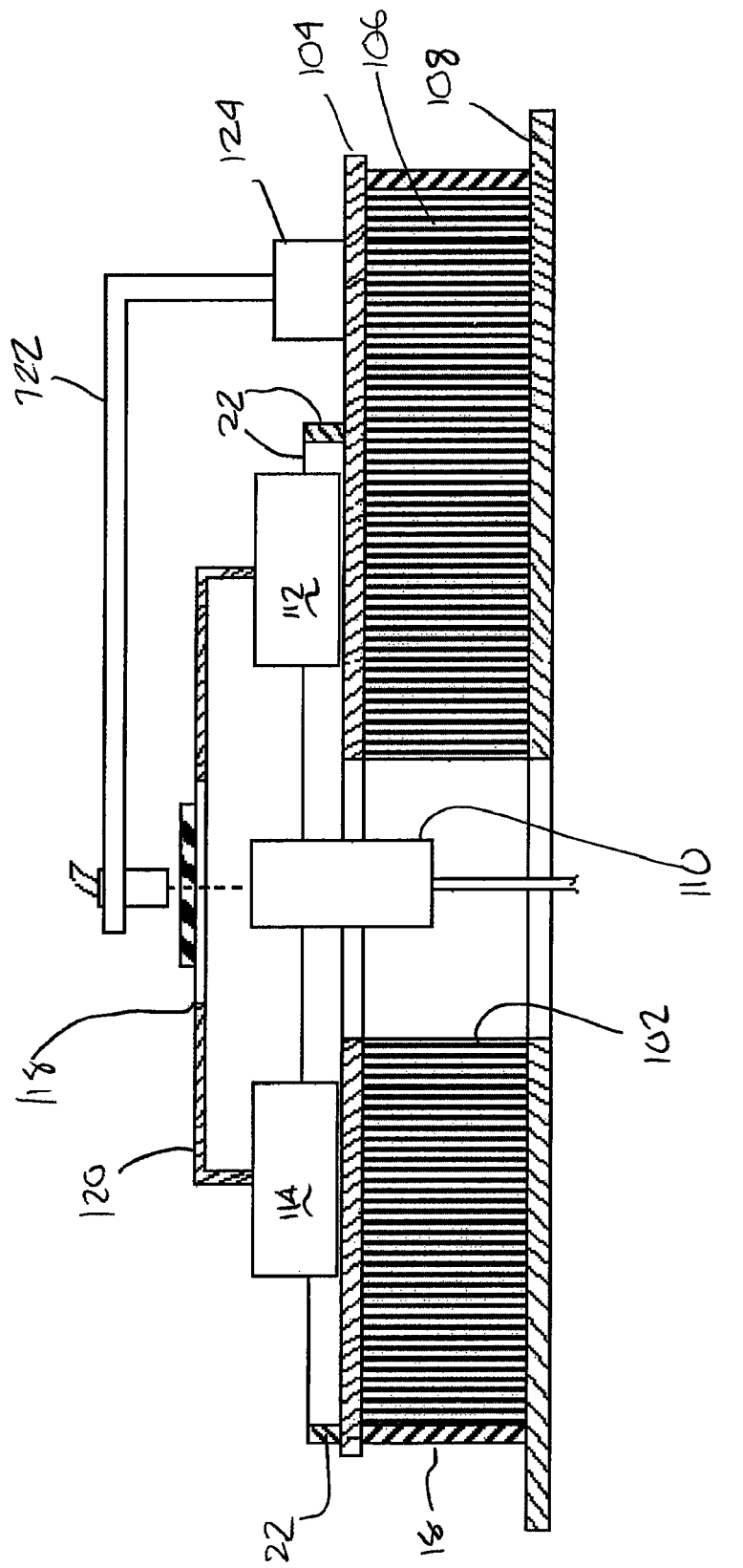
" and FIG. 6 shows further detail of the configuration of FIG. 5 for an inspection application with a sample positioned on a slide positionable by dual forcers working in tandem between vertical aligned inspection equipment.

FIGS. 5 and 6 show an alternate embodiment of a linear drive motor assembly 100 of FIGS. 1 and 2 configured for an end-user or integrator application requiring an access hole 102 through the platen 104, honeycomb core 106, and support plate 108 to allow introduction of equipment 110 along the "Z direction." The access hole 102 may be formed in each individual component and assembly to form the through hole, or after the assembly is complete. The hole(s) 102 may be formed by conventional machining, a laser, electrical discharge machining (EDM), or water jet. The linear drive motor assembly may comprise two forcers 112, 114, which may be programmed to operate in tandem around the access hole 102. In this embodiment, a sample 116 for inspection is positioned on an access window 118 of a slide 120 that is positionable by the dual forcers 112, 114 working in tandem between vertical aligned inspection equipment 110. A fixture 122 mounted preferably to the platen 116 has an arm 124 extending over the slide 120 for supporting a portion of the inspection equipment above the slide. Another portion of the inspection equipment is positioned in the access hole 102. The forcers 112, 114 are programmed to position the slide access window 118 relative to the inspection equipment to allow each portion of the inspection equipment 110 to inspect the sample 116. It should be appreciated that the other equipment in lieu of inspection equipment may positioned relative to the access hole 102. For instance, an integrator could support a work holding fixture or slide mechanism for holding an object between forcers 112, 114 allowing the object to be worked on from one or both sides through equipment positioned in the access hole, thereby allowing for very precise real time coordination of measurements or processes and/or simultaneous operations on the object.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method comprising:
    stocking a plurality of sheets of commercially available, off-the-shelf, expanded honeycomb material having a plurality of stock thicknesses, each sheet of material having a plurality of cells arranged in a planar array, the plurality of cells being defined by walls extending in planes substantially perpendicular to the planar array, the length of the walls defining the stock thickness;
    providing a support plate with a support plate thickness;
    providing a platen with a platen thickness, the platen having a plurality of teeth;
    selecting an axially height of a linear drive motor assembly;
    selecting a sheet of honeycomb material from the plurality based upon its stock thickness such that the honeycomb material sheet stock thickness together with the platen thickness and the support plate thickness correspond to the selected axially thickness;
    cutting the honeycomb material along its width and length to form a core;
    securing the platen directly to one side of the core in a direction parallel to the planar array;
    securing the support plate directly to the axially opposite side of the core; and
    providing a forcer having a motor stack magnetically coupleable to the platen to form the linear drive motor assembly.

2. The method of claim 1, further comprising mounting bumpers on the platen in a pattern defining a motion area for the forcer.

3. The method of claim 2, further comprising mounting work-holding fixtures on the platen outside the motion area.

4. The method of claim 1, further comprising mounting side panels about side faces of the support core.

5. The method of claim 1, wherein the linear drive motor comprises dual axis motor.

6. The method of claim 1, further comprising mounting the support plate to a support structure in an inverted orientation whereby the platen is positioned below the support plate.

7. The method of claim 1, wherein the commercially available, off-the-shelf honeycomb material comprises aluminum.

8. The method of claim 1, further comprising mounting work-holding fixtures on the support plate.

9. The method of claim 1, further comprising forming a hole through the platen, honeycomb core, and support plate.

* * * * *